United States Patent

[11] 3,615,695

| [72] | Inventor | Anthony J. Luksas<br>Chicago, Ill. |
|---|---|---|
| [21] | Appl. No. | 743,049 |
| [22] | Filed | July 8, 1968 |
| [45] | Patented | Oct. 26, 1971 |
| [73] | Assignee | Beatrice Foods Co.<br>Chicago, Ill. |

[54] SOURDOUGH FLAVORING COMPOSITION AND METHOD OF MAKING SAME
9 Claims, No Drawings

[52] U.S. Cl. .................................................. 99/140, 99/59
[51] Int. Cl. ..................................................... A23l 1/22, A23c 9/12
[50] Field of Search ............................................ 99/59, 140, 116, 90, 115

[56] References Cited
UNITED STATES PATENTS

| 2,060,264 | 11/1936 | Swift .......................... | 99/90 |
| 3,298,836 | 1/1967 | Ernstrom ...................... | 99/116 |
| 3,446,627 | 5/1969 | Noznick et al. ................ | 99/115 |

OTHER REFERENCES

"Bergey's Manual of Determinative Bacteriology," The Williams & Wilkins Company, Baltimore (1957), 7th Edition, Pages 339–341 and 457–460

*Primary Examiner*—Morris O. Wolk
*Assistant Examiner*—Warren Bovee
*Attorney*—Cushman, Darby & Cushman ABSTRACT: A casein containing material, preferably skim milk, is acidified with lactic acid or lactic acid forming bacteria, incubated with rennet until curd forms. The curd is separated, suspended in water or salt solution, innoculated with Citrobacter and fermentation carried out with aeration and agitation. The finished product has the odor and flavor of sourdough and can be used as a liquid or spray dried.

SOURDOUGH FLAVORING COMPOSITION AND METHOD OF MAKING SAME

The present invention relates to the preparation of a sourdough-flavored product.

It is frequently desired to impart a sourdough flavor to various foodstuffs. To prepare sourdough in large quantities is a time-consuming operation and requires considerable working space.

It is an object of the present invention to prepare sourdough flavor.

Another object is to reduce the working space required to prepare a sourdough flavor.

A further object is to prepare a sourdough flavor without making dough.

Still further objects and the entire scope of applicability of the present invention will become apparent from the detailed description given hereinafter; it should be understood however, that the detailed description and specific examples, while indicating preferred embodiments of the invention are given by way of illustration only, since various changes and modification within the spirit and scope of the invention will become apparent to those skilled in the art from this detailed description.

It has now been found that these objects can be attained by acidifying a casein-containing material with a lactic acid source, adding rennet, incubating to form a curd, separating the curd, suspending the curd in aqueous medium and inoculating with Micrococci or Citrobacter, aerating and agitating until a product having the odor and flavor of sourdough is obtained.

The casein source is preferably skim milk but other aqueous sources can be used such as whole fat milk, reconstituted sodium caseinate or the like.

The skim milk or other casein source is acidified directly with lactic acid to a pH of 4.5-5, preferably 5.2. There can also be used sodium lactate, potassium lactate. When skim milk or other source of lactose is employed there can be used micro-organisms known to produce lactic acid from lactose. Thus there can be used *Streptococcus lactis, Lactobacillus lactis, Lactobacillus bulgaricus, Lactobacillus delbrueckii, Lactobacillus thermophilus, Lactobacillus casieii, Lactobacillus leichmannii, streptococcus citrovorus, Streptococcus cremoris, Lactobacillus helveticus,* etc.

To the acidified skim milk or other casein source there is added rennet and the mixture incubated for 0.5 hour or until the system sets, i.e., a cord is produced. The curd is separated either by centrifuging filtering or cooking the whey out.

The curd is then resuspended in either water or a saline solution e.g. 5 percent sodium chloride or 0.85 percent sodium chloride in an amount of 0.5 to 10 times the original volume. Preferably the curd is reconstituted to the original volume. Then it is inoculated with a nontoxic organism of either the genera Citrobacter or Micrococcus, aerated, agitated as a fluid system for 1 to 5 days, preferably 3 days.

Suitable organisms include *Citrobacter freundii, Citrobacter intermedic, Micrococcus caseolytics* (e.g. A.T.C.C. 13548), *Micrococcus conglomeratus* (e.g. A.T.C.C. 401), or *Micrococcus freudenreichii* (either A.T.C. 407 or A.T.C. 8459).

All fermentations are carried out at 18°-45° C., preferably 32° C.

The finished product has the odor and flavor of sourdough. It can be left in the liquid form or dried, e.g. by spray drying or roller drying.

The sourdough flavor concentrate (either liquid or dry) prepared by the present invention can be used to impart sourdough flavor to bread and nonbread foods, e.g. rye bread, white bread, whole wheat bread, French bread, pumpernickel, biscuits, rolls, bagels, rice stuffing for turkeys and other fowls, dips made from cheese or sour cream salad dressing, etc.

EXAMPLE 1

100 cc. skim milk was acidified with lactic acid to a pH of 5.2. Rennet was added and the system incubated until a curd was produced (about 30 minutes). The mixture was centrifuged and the curd removed.

The curd was resuspended in 100 cc. of water and inoculated with *Citrobacter freundii* and incubated for 3 days at 320° C., with aeration and vigorous agitation to give a finished product having the odor and flavor of sourdough. The product was spray dried to give a powder which retained the flavor and odor or sourdough.

EXAMPLE 2

The procedure of example 1 was repeated using *Micrococcus caseolytics* (A.T.C. 13548) in place of the Citrobacter. The final fluid product rather than being spray dried was heated to 160° F., to kill the Micrococcus and give a stable fluid product having a strong odor and flavor of sourdough.

EXAMPLE 3

The procedure of example 1 was repeated but instead of lactic acid there was employed *Lactobacillus lactis* which was incubated at 32° C., until the pH of the skim milk fell to 5.2. Then the cultured milk was pasteurized at 161° F., and the rennet added. Further processing was as in example 1 to produce a fluid product having the characteristic odor and flavor of sourdough. The fluid was roller dried. The dry product retained its sourdough odor and flavor.

What is claimed is:

1. A process for producing a sourdough flavor and odor comprising acidifying a casein-containing medium with lactic acid to produce a casein-containing acidified curd, removing the curd from the lactic acid acidified medium, suspending the curd in an aqueous medium, inoculating the curd and aqueous medium with a nontoxic Citrobacter organism and incubating the organism under aerobic conditions until the product has the odor and flavor of sourdough.

2. A process according to claim 1 wherein the incubation is for 1 to 5 days.

3. A process according to claim 1 wherein the Citrobacter is *Citrobacter freundii* or Citrobacter intermedic.

4. A process according to claim 1 wherein a nontoxic Micrococcus organism is grown in the said curd and aqueous medium in addition to the said Citrobacter.

5. A process according to claim 1 wherein the initial curd is prepared by acidifying the casein-containing medium with lactic acid, adding rennet and incubating until the curd is formed.

6. A process according to claim 5 wherein the casein-containing medium is skim milk.

7. A process according to claim 6 wherein the lactic acid is added as lactic acid per se or a salt thereof.

8. A process according to claim 6 wherein the lactic acid is formed in situ by growing lactic acid forming bacteria in whole milk or skim milk.

9. A sourdough flavor and odor containing product prepared by the process of claim 1.

* * * * *